July 26, 1966 A. L. DUNA 3,262,174
LICENSE PLATE CLAMPS
Filed Sept. 9, 1964
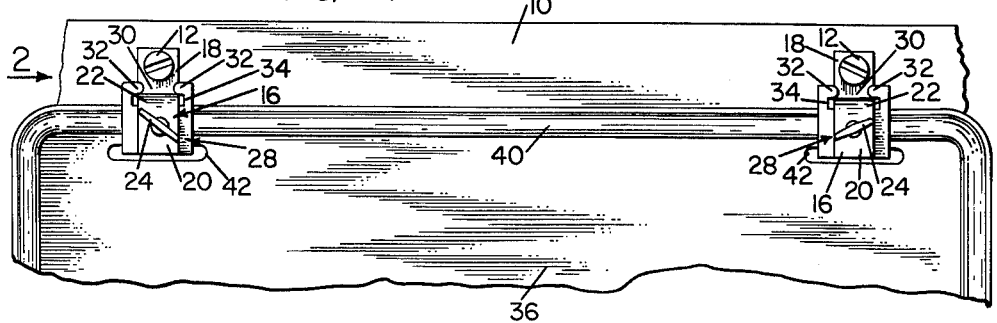
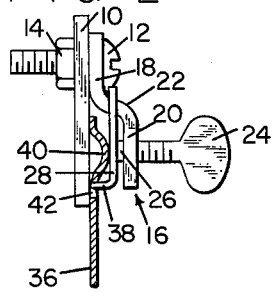
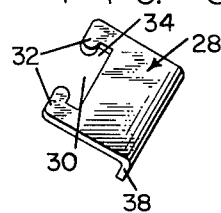
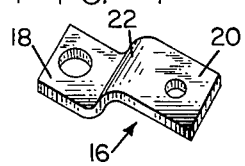
INVENTOR
ALFRED L. DUNA
BY *Charles R. Fay,*
ATTORNEY

3,262,174
LICENSE PLATE CLAMPS
Alfred L. Duna, 5 Lull St., Worcester, Mass.
Filed Sept. 9, 1964, Ser. No. 395,138
2 Claims. (Cl. 24—263)

This invention relates to new and improved license plate clips or clamps which reduce or eliminate a difficulty encountered in changing plates on vehicles with respect to rusty bolts and similar attachments which prevent easy removal of the old plates and application of the new plates. In some areas of the country it is sometimes necessary to use bolt cutters on these license fasteners due to extreme rusting and freezing of the parts.

In the present case a two-part clamp is provided. One part is a plate provided with offset areas through one of which there is threaded a thumbscrew or the like and in the other area there is means provided for permanently securing the plate to the vehicle or license bracket as the case may be; and the other part of the device is a plate member which is provided with means loosely securing it with respect to the first plate in the area of the jog which separates the offsets, the second member bearing directly on the license plate and having in its preferred form a lip engaging the license plate and holding it in position, the free end of the thumbscrew in the first plate bearing on the second plate and tightly securing it in position against the license plate and at the same time providing a spring action so that it acts as a lock washer. With this construction it has been found that the parts cannot shake off even after long periods of use and the thumbscrew is always readily actuated in order to release its underlying, license plate clamping member.

Other objects and advantages of the invention will appear hereinafter.

Reference is to be had to the accompanying drawings in which:

FIG. 1 is a view in elevation illustrating the invention;

FIG. 2 is a side view looking in the direction of arrow 2 in FIG. 1 on an enlarged scale;

FIG. 3 is a perspective view of the underlying clamp plate, and

FIG. 4 is a perspective view of the offset plate.

In illustrating the invention, the same is shown in FIG. 1 as applied to a license plate and reference numeral 10 indicates a portion of the body of the vehicle to which the license plate is to be attached; or on the other hand it may be a bracket especially provided for the purpose of applying the license plate. These members are normally provided with apertures and in this case these apertures are utilized for the reception of bolts 12, 12 which are provided with nuts 14. These bolts secure to the bracket or to the body of the vehicle 10 a generally S-shaped plate member generally indicated by the reference numeral 16 which comprises three main portions. These may be identified as a base 18 through which there is an aperture for the reception of bolt 12; an offset portion 20, and a jog 22, see particularly FIG. 2, which connects the two parts 18 and 20. This member also has a threaded hole through the offset portion 20 for the reception of the thumbscrew 24 which as shown extends from the forward portion thereof to the underside where it is provided with a free end indicated at 26 in FIG. 2. The piece 16 is of course easily stamped out of sheet material preferably stainless steel, galvanized steel or the like.

The second member is a generally flat plate of the same material generally indicated by the reference numeral 28. Along one edge thereof this is died out as at 30 forming a pair of spaced ears 32, 32 and an undercut area at 34. The ears are spaced apart just enough to overlie the edges of the top member 16 in the area adjacent the jog 22 and in fact overlying the flat part 18 thereof as shown in FIG. 1. Otherwise however the main body portion of the plate 28 underlies the plate 16 and is engaged by the free end 26 of the thumbscrew 24 so that it can be rather powerfully held merely by the fingers to clamp the license plate 36. Preferably a downturned lip or edge portion 38 is provided which bears against the license plate 36 under influence of the thumbscrew 24. The screw 24 need only be hand tightened in order to provide for a firm locking of the plate in its position as shown in FIG. 1.

The license plate often has an edge rim portion 40 and the turned-in lip 38 underlies this rim as shown both in FIGS. 1 and 2 so as to prevent escape of the plate; on the other hand the lip at 38 engages the flat part of the license plate powerfully enough so as to clearly lock it in position.

In some cases license plates are provided with elongated slots such as are shown at 42 and in this case it is advantageous sometimes to position the inturned lips 38 in these holes to at least partly pass through the hole and bear against the bracket or body of the car at 10. This is not necessary in order to provide for an extremely strong locking member which is very easily actuated as by backing off on the thumbscrew 24 to release the license plate and insert a new one.

It has been found that only two of these clips are needed for each license plate and they can be applied either at the top of the license plate as illustrated in FIG. 1 or reversed to engage the bottom edge portion of the license plate which will be clear to those skilled in the art.

The more the thumbscrew is turned, the greater will be the tilted relationship between the two plates and the greater will be the spring force which holds the screw against working loose.

Having thus described my invention and the advantages thereof, I do not wish to be limited to the details herein disclosed, otherwise than as set forth in the claims, but what I claim is:

1. A clip for attaching a plate to an object, said clip comprising a substantially Z-shaped first plate which includes two generally parallel flat portions offset with respect to each other and connected by means of a jog, and a second plate which is generally flat, said second plate having means for loosely attaching it to the first plate in the area of the jog thereof so that it underlies a hole formed in one of the offset portions of the first plate and a screw in the hole, said screw bearing on the second named plate and forcing it in a pivoting action away therefrom, and means on the other offset portion of the first-named plate for attaching the same to the object to which it is desired to secure the plate.

2. The clip recited in claim 1 wherein the means for connecting the plates together comprises a pair of spaced inwardly directed opposed ears on the second plate, said ears overlying one of the offset portions of the first-named plate and the main body portion of the second-named plate underlying the other offset portion of the first-named plate.

References Cited by the Examiner
UNITED STATES PATENTS

| | | |
|---|---|---|
| 831,629 | 9/1906 | Rollman. |
| 1,394,988 | 10/1921 | Folberth. |
| 1,404,521 | 1/1922 | Hass _____ 40—210 |
| 2,220,214 | 11/1940 | Cloutier _____ 24—243 |

FOREIGN PATENTS

| | | |
|---|---|---|
| 417,715 | 8/1925 | Germany. |

WILLIAM FELDMAN, *Primary Examiner.*

D. GRIFFIN, *Assistant Examiner.*